P. ROCH & E. CHALLET.
INSTRUMENT FOR MAKING MICROMETRIC MEASUREMENTS.
APPLICATION FILED JULY 28, 1910.
1,005,883.
Patented Oct. 17, 1911.
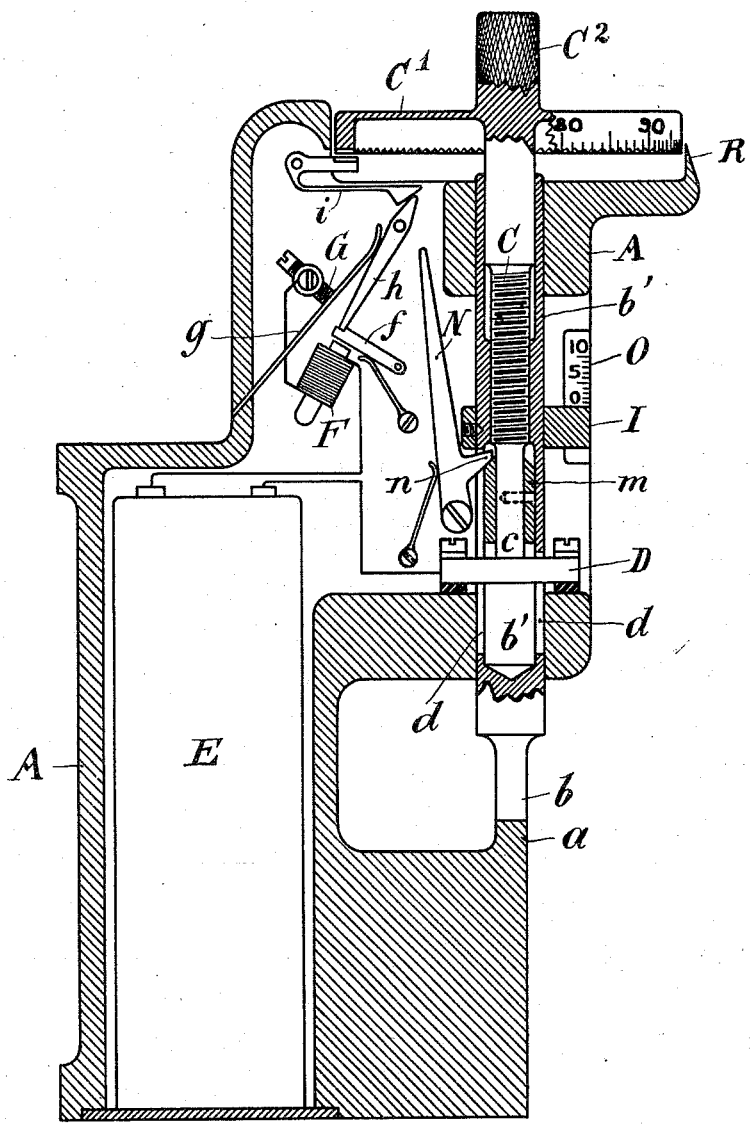

UNITED STATES PATENT OFFICE.

PIERRE ROCH AND ETIENNE CHALLET, OF ROLLE, SWITZERLAND.

INSTRUMENT FOR MAKING MICROMETRIC MEASUREMENTS.

1,005,883. Specification of Letters Patent. Patented Oct. 17, 1911.

Application filed July 23, 1910. Serial No. 574,247.

*To all whom it may concern:*

Be it known that we, PIERRE ROCH and ETIENNE CHALLET, citizens of Switzerland, residing at Rolle, Canton de Vaud, Switzerland, have invented certain new and useful Improvements in Instruments for Making Micrometric Measurements; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved micrometer which measures elements with the utmost precision, being one in which the micrometer screw is locked against any rotation when the two fingers that measure the element are in contact with the element. There are innumerable means by which this locking could be accomplished, but the preferred form illustrated herein is by means of an electric circuit which is made when the fingers contact with the element to be measured and the micrometer screw measures the distance between the fingers, the circuit when made operates a magnet which in turn causes the operation of a latch which locks the micrometer screw against any rotation. It will be seen that this locking takes place at the moment of closest contact of the micrometer screw with the other elements of the measuring portion of the device so that it operates instantly to lock the micrometer screw, and the absolute measurement is secured. This will be understood to be very desirable in the case of the measurement of bodies which are easily collapsed and can not stand very much pressure.

Another object of the invention is to provide the device with means for unlocking the latch when the micrometer screw and the movable finger of the device are drawn back out of contact with the element that has been measured.

The invention is illustrated in the accompanying drawing which is a vertical section of one form of instrument embodying our invention.

The instrument consists of a frame A which is preferably made in the form of a casing and which has a fixed finger $a$ opposite to which is situated a movable finger $b$ which is arranged to slide in the frame and has a tubular portion $b'$ extending up therefrom and preferably integral therewith, the tube and the finger being adapted to be slid longitudinally in the casing or frame. The tubular portion $b'$ is contracted to form a nut which is screw-threaded to receive the micrometer screw C, the lower contacting end $c$ of which normally rests against a cross-bar D passing through slots $d$ in the tubular portion $b'$. The cross-bar D is electrically insulated from the frame A and connected to one pole of the battery E which can be located at any suitable point, but is shown as occupying a recess in the casing. An electro-magnet F is in circuit with wire passing from the battery through said magnet, and then to a contact screw G which is in turn placed in contact with the frame A by means of a spring $g$ which has a normal tendency to break the circuit by having its spring action tending to take it away from the contact screw G. The spring $g$, however, is held in contact by a lever $h$ which is pivoted intermediate of its ends, one end engaging the spring $g$ and being held in turn by the armature $f$. The end of the lever $h$ opposite the armature $f$ engages a latch $i$ which has a toothed or roughened arm which can be thrown into and out of contact with teeth on the under side of the drum $C^1$ of the micrometer screw C, the drum having numerals and scales thereon to indicate the measurements which they register on the index R. A finger piece or head $C^2$ is on the end of the micrometer screw and provides for its manipulation. A sleeve $m$ is fastened to the contacting end $c$ of the micrometer screw C, and has its top surface beveled to engage a nose $n$ on an arm N, which arm is held by a spring normally toward the sleeve $m$. A collar I is secured to the tubular portion and projects through a recess in the casing to prevent rotation of the tubular portion and consequently of the movable finger, and at the same time acts as an index for indicating the units of measurement on the scale O, which scale is fixed to one side of the recess. The scale on the drum $C^1$ indicates the fractions.

The device is shown in the form of a fixed instrument in which the tubular portion and the movable finger $b$ and also the lock $i$ are shown as operated by gravity, but it will be understood that other forces, such as springs, can be used for causing the normal tendency of the movable finger and the micrometer screw toward the fixed finger.

The operation of the device is as follows: The handle C² is grasped and the micrometer screw is pulled upward which brings with it the tubular portion b' and the movable finger b and the sleeve m which engages the nose n and snaps the arm N which is pivoted at one end, so that it throws the lever h to the position shown in the drawing, and the spring actuated armature f holds the lever h in the position in which it is illustrated, the lever h in turn holding the latch i in its unlocked or open position, and also holding the spring g against the contact screw G so that the casing or frame is connected with the battery. When an element to be measured is placed on the fixed finger a, the handle C² is released and the movable finger b comes down on the element to be measured, thereby coöperating with the fixed finger a to grasp the element between them. The bar D remains stationary, not being moved by the tubular portion because the tubular portion has slots therein. The micrometer screw is then turned by means of its handle C², the screw portion C rotating in the screw-threaded nut in the tubular portion and having its contact end c thus forced toward the bar D. When the contact end c engages the bar D it at once closes the circuit, which circuit, when it is thus made, energizes the magnet F, and draws the armature f away from the lever h, the spring g forces the lever h to swing, and at the same time this spring leaves the contact screw G and the circuit is broken. The lever h at its upper end swings against the arm i and the latch i bears on the under side of the drum C¹ and locks the drum against rotation and instantly registers on the scale O and on the index R the dimension or thickness of the element between the fixed finger a and the movable finger b. This locked position of the latch and the open position of the spring g, whereby it breaks the circuit by being out of contact with the contact screw G, is maintained until another element is to be measured, and there is no wear on the battery because the circuit is broken. The circuit is not made until the contact screw and the movable finger are drawn well back to again set the latch and the armature in the position shown in the drawing.

In this specification the term the point of closest contact describes the position of the parts when the movable finger and the fixed finger are in contact with the element being measured, and the screw is adjusted so that the indexes on the scales indicate the distance between said fingers.

Having thus described our invention, what we claim is:—

1. A micrometer comprising a frame having a fixed finger thereon, a movable finger on the frame and adapted to coöperate with the fixed finger to grasp an element to be measured between them, a micrometer screw in the movable finger, said screw forming a means for operating the movable finger, a latch for locking the micrometer screw against rotation, and means actuated by the micrometer screw for automatically operating the latch to lock the screw when the screw the movable finger the element to be measured and the fixed finger are in their closest contact.

2. A micrometer comprising a frame having a fixed finger thereon, a movable finger on the frame and adapted to coöperate with the fixed finger to grasp an element to be measured between them, a micrometer screw in screw-threaded engagement with the movable finger and forming a means for operating the movable finger, a latch for locking the micrometer screw against rotation, means actuated by the micrometer screw for automatically operating the latch to lock the screw when the screw the movable finger the element to be measured and the fixed finger are in their closest contact, and means for releasing the latch when the micrometer screw and the movable finger are withdrawn from the element measured.

3. A micrometer comprising a frame having a fixed finger thereon, a movable finger on the frame, the fingers being adapted to grasp an element to be measured between them, a micrometer screw for operating the movable finger, an electrical circuit normally open, a latch adapted to be operated when the circuit is closed, such operation locking the micrometer screw against rotation and means coöperating with the micrometer screw for closing the circuit when the screw the movable finger and the fixed finger are in their closest contact.

4. A micrometer comprising a frame having a fixed finger thereon, a movable finger on the frame, the fingers being adapted to grasp an element to be measured between them, a micrometer-screw for operating the movable finger, an electric circuit normally open, a latch adapted to be placed in its locking position when the circuit is closed, said latch operating to lock the micrometer-screw against rotation, means in the circuit for operating the latch, means coöperating with the micrometer-screw for closing the circuit when the screw, the movable finger and the fixed finger are in their closest contact, and means for automatically releasing the latch when the movable finger is withdrawn.

5. A micrometer comprising a frame with a fixed finger thereon, a movable finger on the frame and adapted to coöperate with the fixed finger to grasp an element to be measured between them, a micrometer screw in screw-threaded relation with the movable finger, a latch for engaging the screw to lock it against rotation, an electro-magnet, an electric circuit in which the magnet is placed, an operative connection between the magnet and the latch for operating the latch, the latch being normally in its inoperative position when the circuit is broken, one terminal of the circuit being the micrometer screw, the second terminal of the circuit being arranged in the finger, the screw and the movable finger making the circuit when the screw is screwed into the finger to contact with the second terminal.

6. A micrometer comprising a frame with a fixed finger thereon, a movable finger on the frame and adapted to coöperate with the fixed finger to grasp an element to be measured between them, a micrometer screw in screw-threaded relation with the movable finger, a latch for engaging the screw to lock it against rotation, an electro-magnet, an electric circuit in which the magnet is placed, an operative connection between the magnet and the latch for operating the latch, the latch being normally in its inoperative position when the circuit is broken, means for making the circuit when the screw, the movable finger and the fixed finger are in their closest contact, and means for resetting the latch in its inoperative position when the movable finger is slid back.

7. A micrometer comprising a frame having a fixed finger thereon, a movable finger on the frame and adapted to coöperate with the fixed finger to grasp an element to be measured between them, the movable finger being arranged to slide and being held against rotation, a micrometer screw arranged in screw-threaded relation with the movable finger, the micrometer screw being adapted to move with the movable finger when the latter is slid, a latch for locking the micrometer screw against rotation, and means for operating the latch when the movable finger and the micrometer screw are in their closest contact.

8. A micrometer comprising a frame having a fixed finger thereon, a sliding finger in the frame having a tube attached thereto, a micrometer screw arranged in screw-threaded relation with the tube and having a handle thereon for its manipulation, a magnet, an electric circuit in which the magnet is placed, one terminal of the circuit being connected with the fixed finger, a bar constituting the other terminal of the circuit, the bar being insulated from the fixed finger and being adapted to be engaged by the micrometer screw to make the circuit, and a latch, means for locking the latch, the locking means being adapted to be operated by the magnet when the circuit is made to lock the micrometer screw against rotation.

9. A micrometer comprising a frame having a fixed finger thereon, a sliding finger in the frame having a tube attached thereto, a micrometer screw arranged in screw-threaded relation with the tube and having a handle thereon for its manipulation, a magnet, an electric circuit in which the magnet is placed, one terminal of the circuit being the fixed finger, a bar constituting the other terminal, the bar being insulated from the fixed finger and adapted to be engaged by the micrometer screw to make the circuit, a latch, locking means for the latch said locking means being adapted to be operated by the magnet when the circuit is made so as to lock the micrometer screw against rotation, and means for resetting the latch in its open position when the movable finger with the micrometer screw is slid back.

10. A micrometer comprising a frame having a fixed finger thereon, a sliding finger in the frame having a tubular portion attached thereto, a micrometer screw arranged in screw-threaded relation with the tubular portion and having a handle thereon for its manipulation, a source of electric current, an electric circuit including such source, means for putting the casing in and out of the circuit, a bar forming one terminal of the electric circuit, the micrometer screw forming the second terminal of the electric circuit and being adapted to be placed in contact with the bar, a latch for locking the micrometer screw against rotation, a magnet in the electric circuit, an armature for the magnet, an operative connection between the armature and the latch to limit the downward motion of the latch when released from locking position while the electric circuit is broken, the circuit being adapted to be made when the micrometer screw touches the bar and the armature then releases the operative connection to raise the latch in the locking position, an arm disposed to re-set the operative connection when the arm is swung, and co-acting means on the micrometer screw and the arm for swinging the arm to release the latch from locking position when the micrometer screw and the tubular portion are withdrawn.

In testimony, that we claim the foregoing, we have hereunto set our hands this eighteenth day of July 1910.

PIERRE ROCH.
ETIENNE CHALLET.

Witnesses:
L. H. MUNIER,
P. Q. TOLLBERGER.

Copies of this patent may be obtained for five cents each, by addressing the "Commissioner of Patents, Washington, D. C."